UNITED STATES PATENT OFFICE.

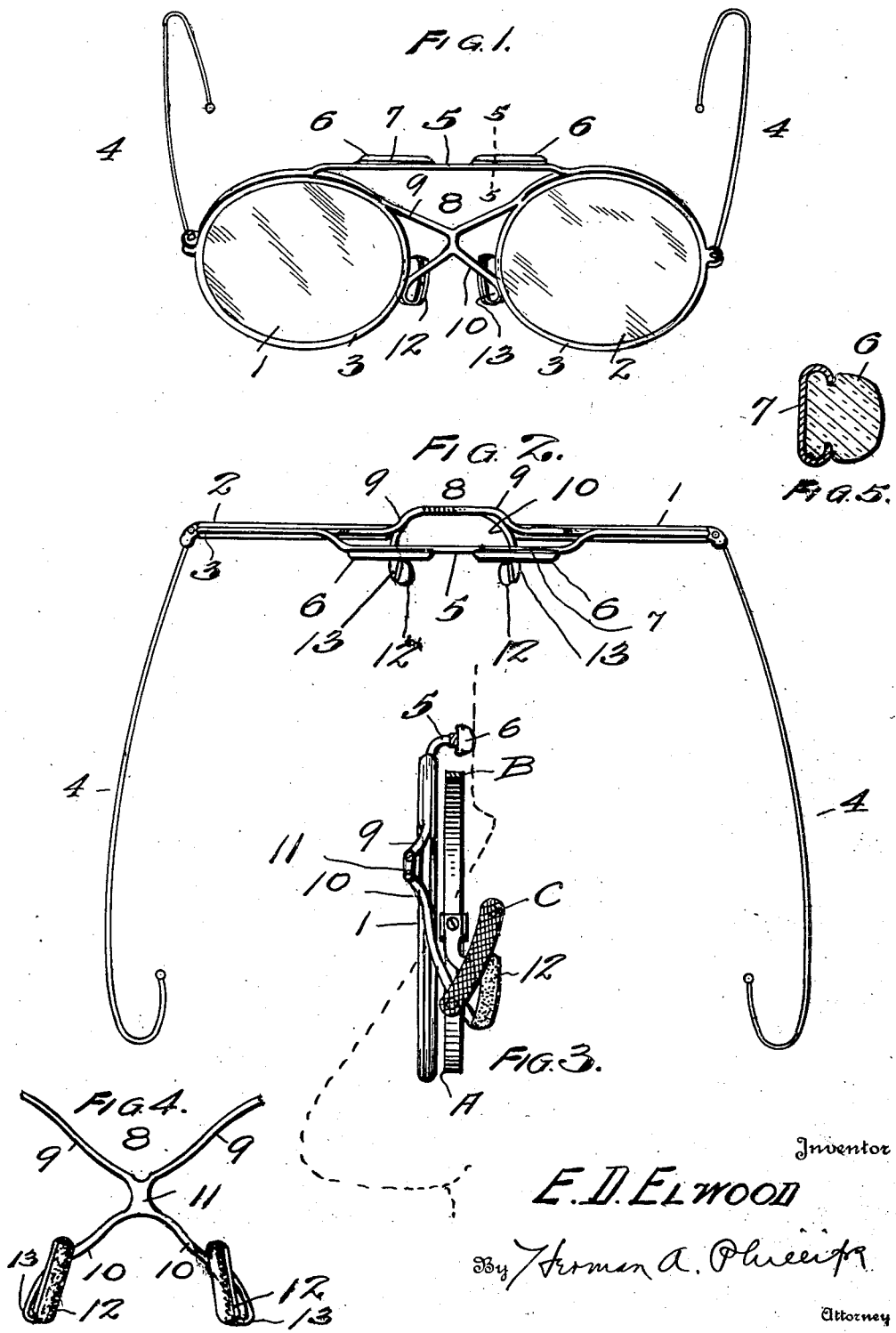

ELMER D. ELWOOD, OF MEDFORD, OREGON.

SPECTACLE-FRAME.

1,238,396.    Specification of Letters Patent.    Patented Aug. 28, 1917.

Application filed March 20, 1917. Serial No. 156,133.

*To all whom it may concern:*

Be it known that I, ELMER D. ELWOOD, a citizen of the United States of America, residing at Medford, in the county of Jackson and State of Oregon, have invented new and useful Improvements in Spectacle-Frames, of which the following is a specification.

My present invention relates to improvements in spectacle frames or mountings, and is especially designed for use to hold colored or plain lenses of a pair of goggles to be worn over the usual eyeglasses for the protection of the eyes against irritating and glaring light rays, dust, etc. The primary object of the invention is the provision of a pair of goggles having frames or mountings that will adapt them for use with the customary eyeglasses so that the goggles may be worn with comfort and convenience without interfering with the usual functions of the eye glasses.

The invention consists in certain novel combinations and arrangements of the head rest and guards of the frame as will be more specifically set forth in the following specification and set forth in the appended claims.

In the accompanying drawings I have illustrated one complete example of the physical embodiment of my invention constructed according to the best mode I have so far devised for the practical application of the principles of my invention, and frames or mountings constructed as illustrated have proven highly successful in actual use.

Figure 1 is a front elevation, tipped slightly forward, showing a pair of glasses or goggles embodying the novel features of my invention.

Fig. 2 is a top plan view of the glasses or spectacles. Fig. 3 is an enlarged sectional view, at the center of the mounting of the goggles, showing also a usual eyeglass in section, to illustrate the relation of my glasses or spectacles to the eyeglasses, as in actual use.

Fig. 4 is a view enlarged of the lower guard and nose rests of the mounting.

Fig. 5 is an enlarged, sectional view illustrating the cork rest used for both the upper or bridge guard resting against the forehead, and the lower guard with the nose rests.

In the preferred form of my invention as illustrated in the drawings the lenses 1 and 2 are or may be of colored glass, or plain glass as required, inclosed within the metallic rims 3, from which the bows 4 extend backward as usual to fit over the ears of the wearer.

The bar or bridge 5 extending horizontally between the rims of the two lenses is integral or rigid with these rims, is designed to support the two head-rests 6, 6, preferably of cork or other suitable material, and adapted to contact with the forehead of the wearer. These rests are secured in the bar by a special construction of the bar, which as shown in Fig. 5, at 7 is fashioned as a channel bar with inturned flanges opposed to each other and the cork rest 6 is slipped into this channel and held there by friction.

The lower guard or spider 8, comprises the four diametrically arranged arms 9, 9, and 10, 10, joined at the center point 11, and the guard is positioned beneath the bridge bar 5 and between the two lenses as usual. The two upper arms 9 9 are fixed to the rims of the lenses and project downwardly and outwardly so that the center joint 11 of the guard is located in a plane in front of the plane of the lenses, and the adjustable, or flexible arms 10, 10 project inwardly therefrom so that the cork rest pieces 12 for the nose are located in a plane at the rear of the plane of the lenses. At 13 the arms 10 are bent upwardly and formed as channel bars to receive the cork pieces 12, in manner similar to the construction set forth in Fig. 5, except that of course the cork rests 12 stand in an approximate vertical plane and the rests 6 lie in a horizontal plane.

To illustrate the use of my spectacles, in Fig. 3 I have indicated a portion of an ordinary eyeglass, A being one of the lenses, B the metallic bridge or curved upper guard, and C, a usual type of nose rest. With the eyeglasses applied to the nose as in Fig. 3, my spectacles are fitted over them, the two rest pieces 12, fitting one at each side of the nose and the upper rests 6 6 fitting against the forehead, while the bows 4 4 of course hold the spectacles or goggles when hooked behind the ears of the wearer. In this manner the spectacles or goggles are held clear of the eyeglasses, without contacting with or interfering with the eyeglasses, and as the mounting 8 of the underguard is flexible or resilient, it can be easily adjusted and fitted to the nose.

What I claim is:—

1. The combination in a spectacle mounting with the lenses and rims therefor, of a bridge bar having a head rest thereon and attached to the rims, and a lower mounting suspended from the rims having adjustable diverging arms, and a nose rest on each arm.

2. The combination in a spectacle mounting with the lenses and rims therefor, of a bridge bar formed with a channel portion and a head rest fitted therein, and said bridge bar rigidly connected with the rims, a lower mounting suspended from said rims comprising four diametrically arranged arms, the lower pair of said arms having channel portions, and a nose rest fitted in each of said channel portions.

In testimony whereof I affix my signature.

ELMER D. ELWOOD.